(12) United States Patent
Wang et al.

(10) Patent No.: US 10,699,150 B2
(45) Date of Patent: Jun. 30, 2020

(54) MACHINE GUIDED PHOTO AND VIDEO COMPOSITION

(71) Applicant: Polarr, Inc., Palo Alto, CA (US)

(72) Inventors: Borui Wang, San Jose, CA (US); Zhen Hua Yan, San Jose, CA (US)

(73) Assignee: Polarr, Inc., Palo Alto, CA (US)

( * ) Notice: Subject to any disclaimer, the term of this patent is extended or adjusted under 35 U.S.C. 154(b) by 99 days.

(21) Appl. No.: 16/168,735

(22) Filed: Oct. 23, 2018

(65) Prior Publication Data

US 2020/0125880 A1    Apr. 23, 2020

(51) Int. Cl.
| | | |
|---|---|---|
| G06K 9/00 | (2006.01) | |
| G06K 9/32 | (2006.01) | |
| G06T 7/60 | (2017.01) | |
| G06N 3/08 | (2006.01) | |
| G06N 20/00 | (2019.01) | |

(52) U.S. Cl.
CPC ....... *G06K 9/3241* (2013.01); *G06K 9/00369* (2013.01); *G06N 3/08* (2013.01); *G06N 20/00* (2019.01); *G06T 7/60* (2013.01); *G06T 2207/20132* (2013.01)

(58) Field of Classification Search
CPC .. G06K 9/3241; G06K 9/00369; G06N 20/00; G06N 3/08; G06T 7/60; G06T 2207/20132
USPC ....................................................... 382/103
See application file for complete search history.

(56) References Cited

U.S. PATENT DOCUMENTS

| | | | | |
|---|---|---|---|---|
| 10,075,653 | B2 * | 9/2018 | Jeong | H04N 5/2621 |
| 2007/0146528 | A1 * | 6/2007 | Yanagi | H04N 5/23293 |
| | | | | 348/333.01 |
| 2008/0240563 | A1 * | 10/2008 | Takano | H04N 5/23219 |
| | | | | 382/173 |
| 2014/0204244 | A1 * | 7/2014 | Choi | H04N 5/23222 |
| | | | | 348/231.99 |
| 2017/0118413 | A1 * | 4/2017 | Shin | H04N 5/2628 |
| 2018/0108158 | A1 * | 4/2018 | Sharma | G06F 3/04845 |
| 2018/0196587 | A1 * | 7/2018 | Bialynicka-Birula | |
| | | | | H04N 1/215 |
| 2018/0357501 | A1 * | 12/2018 | Ma | G06K 9/6256 |
| 2018/0367752 | A1 * | 12/2018 | Donsbach | G06K 9/66 |
| 2019/0108640 | A1 * | 4/2019 | Zhang | G06N 3/0454 |
| 2019/0109981 | A1 * | 4/2019 | Zhang | H04N 5/23222 |

* cited by examiner

*Primary Examiner* — Van D Huynh
(74) *Attorney, Agent, or Firm* — Rowan TELS LLC

(57) ABSTRACT

A process for operating a machine guided photo and video composition system involves generating processed image data. The process operates an object detection engine to identify objects and object locations in the processed image data. The process operates a computer vision analysis engine to identify geometric attributes of objects. The process operates an image cropping engine to select potential cropped image locations within the processed image data. The image cropping engine generates crop location scores for each of the potential cropped image locations and determine highest scored cropped image location. The image cropping engine communicates a highest crop location score to a score evaluator gate. The process generates object classifications from the object locations and the geometric attributes. The process receives device instructions at a user interface controller by way of the score evaluator gate. The method displays device positioning instructions through a display device.

7 Claims, 17 Drawing Sheets

MACHINE GUIDED PHOTO AND VIDEO COMPOSITION

BACKGROUND

Convolutional neural networks (CNNs) are particularly well suited to classifying features in data sets modelled in two or three dimensions. This makes CNNs popular for image classification, because images can be represented in computer memories in three dimensions (two dimensions for width and height, and a third dimension for pixel features like color components and intensity). For example a color JPEG image of size 480×480 pixels can be modelled in computer memory using an array that is 480×480×3, where each of the values of the third dimension is a red, green, or blue color component intensity for the pixel ranging from 0 to 255. Inputting this array of numbers to a trained CNN will generate outputs that describe the probability of the image being a certain class (0.80 for cat, 0.15 for dog, 0.05 for bird, etc.). Image classification is the task of taking an input image and outputting a class (a cat, dog, etc.) or a probability of classes that best describes the image.

Fundamentally, CNNs input the data set, pass it through a series of convolutional transformations, nonlinear activation functions (e.g., RELU), and pooling operations (down sampling, e.g., maxpool), and an output layer (e.g., softmax) to generate the classifications.

The skill of photography can be difficult to grasp as many of the deciding factors for adjusting settings may be subjective and not easily quantifiable. As such, determining an ideal photo composition can be a difficult task as the subject matter, lighting, and environment can be highly variable. Therefore a need exists for improving photo composition by novice photographers.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
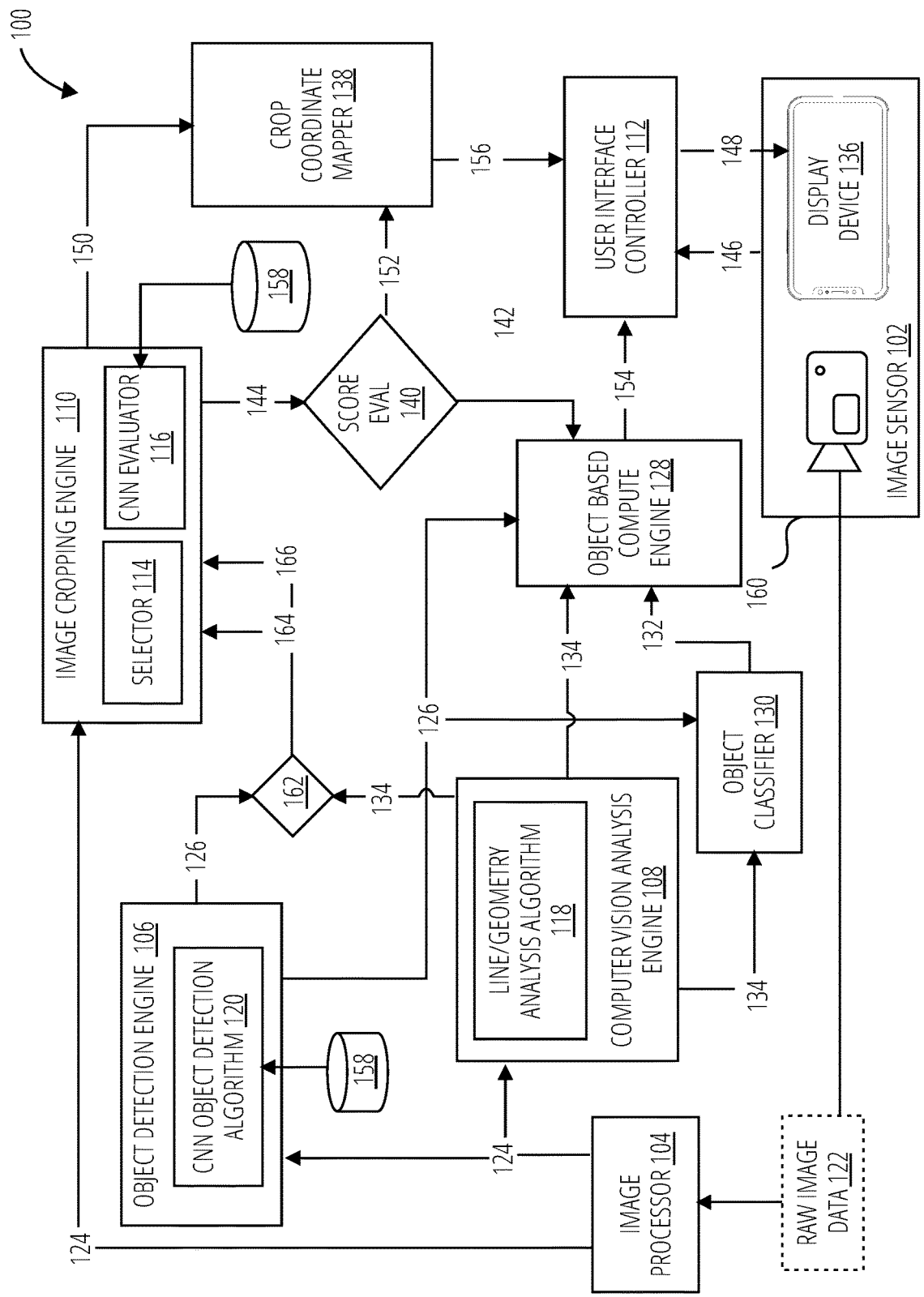
FIG. 1 illustrates a system 100 in accordance with one embodiment.

A method for operating a machine guided photo and video composition system involves generating processed image data with reduced pixel channel values from raw image data through operation of an image processor. The process operates an object detection engine to identify objects and object locations in the processed image data through use of an object detection algorithm. The process operates a computer vision analysis engine to identify geometric attributes of objects in the processed image data through use of a line geometry analysis algorithm. The process operates an image cropping engine to select potential cropped image locations within the processed image data through operation of a selector. The image cropping engine generates crop location scores for each of the potential cropped image locations and determines a highest scored cropped image location through operation of a cropped image evaluator. The image cropping engine communicates the highest crop location score for the highest scored cropped image location to a score evaluator gate. The process generates object classifications from the object locations and the geometric attributes through operation of an object classifier. The process receives device instructions at a user interface controller by way of the score evaluator gate. The process configures a display device to display the device positioning instructions.

In some configurations, the line geometry analysis algorithm of the computer vision analysis engine identifies geometric attributes by initially performing line detections based on first using edge detections via Sobel filters. Once the system determines the edge pixels, the system attempts to fit lines onto the distribution of the pixels to show lines. The system may also compute the gradient, entropy, and saliency of a given image to determine which region within an image is most interesting.

In some configurations, the system may utilize a CNN approach for object detection by deploying a MobileNets+SSD model to determine what objects are within a photo. Once the dominant lines, interesting regions, and also main objects, are detected the object based compute engine may provide instructions on how these shapes and objects need to be composed. These rules include symmetry, balancing elements, emphasis of main object, leading lines/vanishing point, rule of thirds. The algorithm attempts to place these shapes and objects within the image to satisfy one or many of these rules.

The raw image data (i.e., raw image stream) may be generated from an image sensor (i.e., camera) associated with a camera equipped hardware device such as a mobile phone, smart camera device, etc. The image sensor may be associated with a software application (e.g., camera app) running on the camera equipped hardware device. The camera equipped hardware device may display user interface controls through a display device as a layer overlaid above the image sensor data (i.e., images/image stream) when the camera app is being operated.

In the process, the device positioning instructions may be displayed through a user interface of a camera application viewable on the display device. The device positioning instructions may include instructions viewable to a user to move/rotate the position of the camera/camera equipped hardware device in order to capture certain objects in the field of view. In some instances, the instructions may indicate to the user that the camera/camera equipped hardware device may need to be tilted. The instructions may also indicate to the user that they need to move the camera/camera equipped hardware device forward or backwards from its initial position and/or zoom in or out, in order to capture a certain view of the objects. In some instances, the device instructions may indicate to the user certain setting that may need to be modified such as exposure, shutter speed, and/or other camera setting.

The object detection algorithm may utilize a convolutional neural network (CNN) machine learning algorithm to identify the objects and the object locations in the processed image data. The CNN machine learning algorithm utilized by the object detection algorithm may be trained utilizing a training image database to identify objects and their locations based on the image recognition training. During operation of the object detection algorithm, the algorithm receives processed image data from the image processor. The processed image data comprises reduced pixel channel values that may be the result of the raw image data being resized and recolored (e.g., gray scale) to denoise the image detection process.

The cropped image evaluator may utilize a convolutional neural network (CNN) machine learning algorithm to determine the highest scored cropped image location. The CNN machine learning algorithm utilized by the cropped image evaluator may be trained utilizing a training image database to identify preferred image compositions with the detected objects from the possible cropped image locations. The possible cropped image locations may be scored and ranked by the cropped image evaluator based a comparison with the training data set. The highest scoring cropped image location may then be communicated to the crop coordinate mapper to generate device instructions to adjust the position and settings of the camera equipped hardware device from its current position/settings to the new position/settings that would fit the setting for the highest scored cropped image location.

After the image cropping engine communicates the highest crop location score for the highest scored cropped image location to the score evaluator gate, the score evaluator gate releases a control to a crop coordinate mapper if the highest crop location score is greater than a crop score threshold. The crop coordinate mapper then generates the device instructions comprising device zoom, focus, and rotation instructions. The crop coordinate mapper then communicates the device instructions to the user interface controller to generate user viewable instructions in a user interface. An example of the focus instructions would be the displaying of indicators showing the current focal point location of the mobile image sensor, and the new focal point associated with the device instructions. The user would then move the device towards the new focal point in order to align the current focal point with the new focal point such that the movement shows the overlap of the two focal points when the device is repositioned. An example of the zoom instructions may be displayed as a highlighted subsection surrounding the new focal point where the user would zoom into or move the camera equipped hardware device forward such that the highlighted subsection disappears.

The image cropping engine finds image crop locations (i.e., sub regions within the processed image data) with resemble favorable image compositions (i.e., aesthetically pleasing relational positioning of detected objects within the aspect ratio of the processed image data) determined through operation of a trained convolutional neural network.

Each crop location determined by the image cropping engine has an associated aesthetics score indicating how aesthetically pleasing this particular crop location is. This score is generated from the image cropping engine. In some instances, the best crop location may have a crop score that is below the crop score threshold. In this situation, the low crop score threshold could mean that the selector of the image cropping engine did not find any regions of the processed image data that were of interest to the CNN evaluator.

In some instances, the score evaluator gate releases a control to an object based compute engine if the highest crop location score is lower than a crop score threshold. The object based compute engine then generates the device instructions comprising device focus and rotation instructions from the object locations, the geometric attributes, and the object classifications. The object based compute engine communicates the device instructions to the user interface controller.

The user interface controller may generate revised device positioning instructions in response to device position information being received from the display device. Revised device positioning instructions may be generated by the user interface controller indicating to the user that the camera equipped hardware device may need to be repositioned again in order to align the camera equipped hardware device to the cropped image area. The revised device instructions may be a corrective instruction if the user moves too far or followed the instructions incorrectly.

A machine guided photo and video composition system utilizes a user video live stream from a camera equipped hardware device as an input and guides the user to move/rotate the hardware, and/or step forward or backward in order to create a more ideal image composition.

The method utilizes a convolutional neural network machine learning algorithm that analyzes geometry, objects, and people in the live image stream with a continuous buffer that memorizes a sequence of frames to compute the recommended movement, rotation, and step forward/backward actions for the end users. The method may operate in low latency and with low raw image usage. The method may utilize a convolutional neural network trained with photos having a blue X in the background to allow for the manual labeling of good and bad crops. In some instances, a "crop" may be larger or smaller than the rectangle of the view finder/capture window of the display device. In some instances, the system may determine which objects may need to be cropped according to the instructions provided by the CNN.

The method may be operated such that the raw image is a single still image in order to reduce the load to the system. The single still image may be the average of seven or eight frames of captured by the image sensor as stream of raw sensor data that serves as the starting image for the method. After a recommended shot (i.e., ideal image crop) is determined, the system may stop calculating changes and just display a dot on the device application to where the user must move the device to focus in on application desired object.

FIG. 1 illustrates a system 100 for machine guided photo and video composition. The system 100 comprises a camera equipped hardware device 160 comprising an image sensor 102 and a display device 136, an image processor 104, an object detection engine 106 comprising an object detection algorithm 120, an image cropping engine 110 comprising a selector 114 and a cropped image evaluator 116, a crop coordinate mapper 138, a score evaluator gate 140, computer vision analysis engine 108 comprising a line/geometry analysis algorithm 118, an object classifier 130, an object based compute engine 128, a training image database 158, and a user interface controller 112.

The image sensor 102 of the camera equipped hardware device 160 communicates raw image data 122 to the image processor 104. The image processor 104 performs some pre-processing operations to the raw image data 122 in order to reduce the pixel channel values of the raw image data 122. The image processor 104 may modify the color channel values within the raw image data 122 as well as resize the raw image data 122 to facilitate processing by the object detection engine 106, the computer vision analysis engine 108, and the image cropping engine 110. When the image processor 104 completes its pre-processing operations, it generates processed image data 124 comprising reduced pixel channel values. The processed image data 124 may then be communicated to the object detection engine 106, the computer vision analysis engine 108, and the image cropping engine 110.

The object detection engine 106 includes an object detection algorithm 120 trained by a convolutional neural networking utilizing training images from the training image database 158. The object detection algorithm 120 performs operations on the processed image data 124 and determines objects and the object locations 126.

The computer vision analysis engine 108 receives the processed image data 124 from the image processor 104. The line/geometry analysis algorithm 118 performs operations on the processed image data 124 to determine geometric attributes 134 of the objects in the processed image data. The computer vision analysis engine 108 communicates the geometric attributes 134 to an object classifier 130. The object classifier 130 utilizes the geometric attributes 134 and the object locations 126 to generate an object classifications 132 for the objects within the processed image data 124.

The image cropping engine 110 receives processed image data 124 from the image processor 104 to determine cropped image locations within the processed image data 124. The cropped image locations may be initially identified by a selector 114 which may then communicate the cropped image locations to a cropped image evaluator 116. The cropped image evaluator 116 may score each cropped image location and ranks the cropped image locations according to crop location score. In some configurations, the cropped image evaluator 116 may be trained by a convolutional neural network to identify optimal crop locations based training data it has been provided with from a training image database 158. The training data may allow the cropped image evaluator 116 to identify patterns associated with idealized image compositions in order to evaluate and rank the cropped image locations. After the cropped image evaluator 116 scores and ranks the cropped image locations, the image cropping engine 110 communicates a crop location score 144 to a score evaluator gate 140 and associated with the highest scoring cropped image location 150 to the crop coordinate mapper 138.

The object locations 126 from the object detection engine 106 as well as geometric attributes 134 from the computer vision analysis engine 108 may be communicated to the image cropping engine 110 by way of a switch 162. The switch 162 may be configured by an avoid object amputation control, a user preference, to communicate object locations 164 and geometric attributes 166 to the image cropping engine 110 as additional inputs to prevent detected objects from being cutoff (amputated) by the edges of the image crop location.

The object detection engine 106 and the computer vision analysis engine 108 generate object locations 126 and the geometric attributes 134 as sets of bounding boxes of around objects detected within the processed image data 124. For example, for a selfie, the object detection engine, detects a face and sets a bounding box around the face. The object locations 164 and the geometric attributes 166 are represented via a bounding boxes, along with a label. This information may be utilized by the selector 114 to select candidate crops that do not cut through the bounding box of the detected object and the cropped image evaluator 116 may then select the cropped image location 150 with the highest crop location score from the selected set.

In some configurations, the object classifier 130 includes a decision tree where it may determine if the object is a person, animal, food, or building. The decision tree may be a series of decisions where if the algorithm determines that the object is not a person, the next decision determines whether the object is an animal. If the algorithm determines that the object is not an animal, the algorithm then determines whether or not the object is a food. If the algorithm determines that the object is not food, the algorithm then determines whether the object is a building. If the algorithm determines that the object is not a building, the algorithm then determines if there are dominant lines in the location associated with the object location. If dominant lines are at least present, the object classifier 130 communicates the object classifications 132 to the object based compute engine 128. If dominant lines are not present, the object classifier 130 does not generate an object classification.

The score evaluator gate 140 determines whether the object based compute engine 128 or the crop coordinate mapper 138 generates the device instructions. The score evaluator gate 140 receives the crop location score 144 from the image cropping engine 110 and depending value relative to the crop score threshold, communicates a control 142 to the object based compute engine 128 or a control 152 to the crop coordinate mapper 138.

If the crop location score 144 is below the crop score threshold, the score evaluator gate 140 communicates a control 142 to the object based compute engine 128. The object based compute engine 128 generates a device focus and rotation instructions 154 from the object locations 126, the geometric attributes 134, and the object classifications 132. The object based compute engine 128 then communicates the device focus and rotation instructions 154 to the user interface controller 112.

If the score evaluator gate 140 determines that the crop location score 144 is greater than the crop score threshold, the score evaluator gate 140 communicates a control 152 to the crop coordinate mapper 138 in order to generate a device zoom, focus, and rotation instructions 156 from the cropped image location 150. The crop coordinate mapper 138 then communicates the device zoom, focus, and rotation instructions 156 to the user interface controller 112.

The user interface controller 112 transforms device instructions from the object based compute engine 128 or the crop coordinate mapper 138 into device positioning instructions 148 that are shown to a user through a user interface shown in the display device 136 of the camera equipped hardware device 160.

The camera equipped hardware device 160 may be operating a software application to control a user interface associated with the image sensor 102 and the process for operating the machine guided photo and video composition system as well. In some instances, the camera equipped hardware device 160 communicates the current device position 146 to the user interface controller 112 to allow the user interface controller 112 to generate device positioning instructions 148 from the device instructions. Additionally, the current device position 146 may be utilized by the process to generate revised device positioning instructions based on initial changes to the device positioning that do not result in the alignment or position the device in alignment with the device positioning instructions 148.

The system 100 may be operated in accordance with the processes described in FIG. 2, FIG. 3, FIG. 4, FIG. 5, FIG. 6, and FIG. 7.

Figure 2:
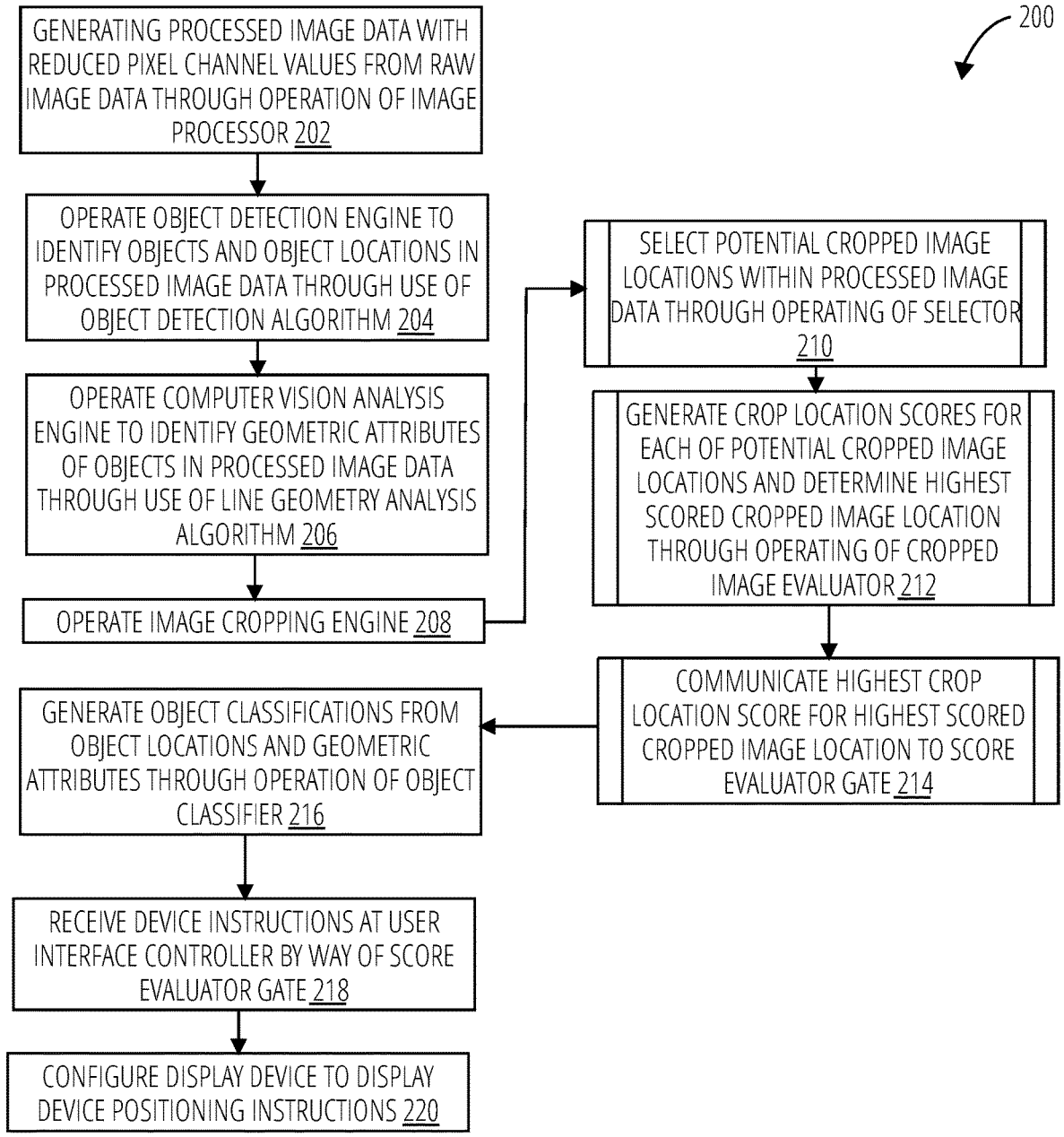
FIG. 2 illustrates a method 200 in accordance with one embodiment.

Referencing FIG. 2, a method 200 for operating a machine guided photo and video composition system involves generating processed image data with reduced pixel channel values from raw image data through operation of an image processor (block 202). In block 204, method 200 operates an object detection engine to identify objects and object locations in the processed image data through the use of an object detection algorithm. In block 206, method 200 operates a computer vision analysis engine to identify geometric attributes of objects in the processed image data through the use of a line geometry analysis algorithm. In block 208, method 200 operates an image cropping engine. In subroutine block 210, method 200 selects potential cropped image locations within the processed image data through operation of a selector. In subroutine block 212, method 200 generates crop location scores for each of the potential cropped image locations and determines the highest scored cropped image location through operation of a cropped image evaluator. In subroutine block 214, method 200 communicates the highest crop location score for the highest scored cropped image location to a score evaluator gate. In block 216, method 200 generates object classifications from the object locations and the geometric attributes through operation of an object classifier. In block 218, method 200 receives device instructions at a user interface controller by way of the score evaluator gate. In block 220, method 200 configures a display device to display the device positioning instructions.

Figure 3:
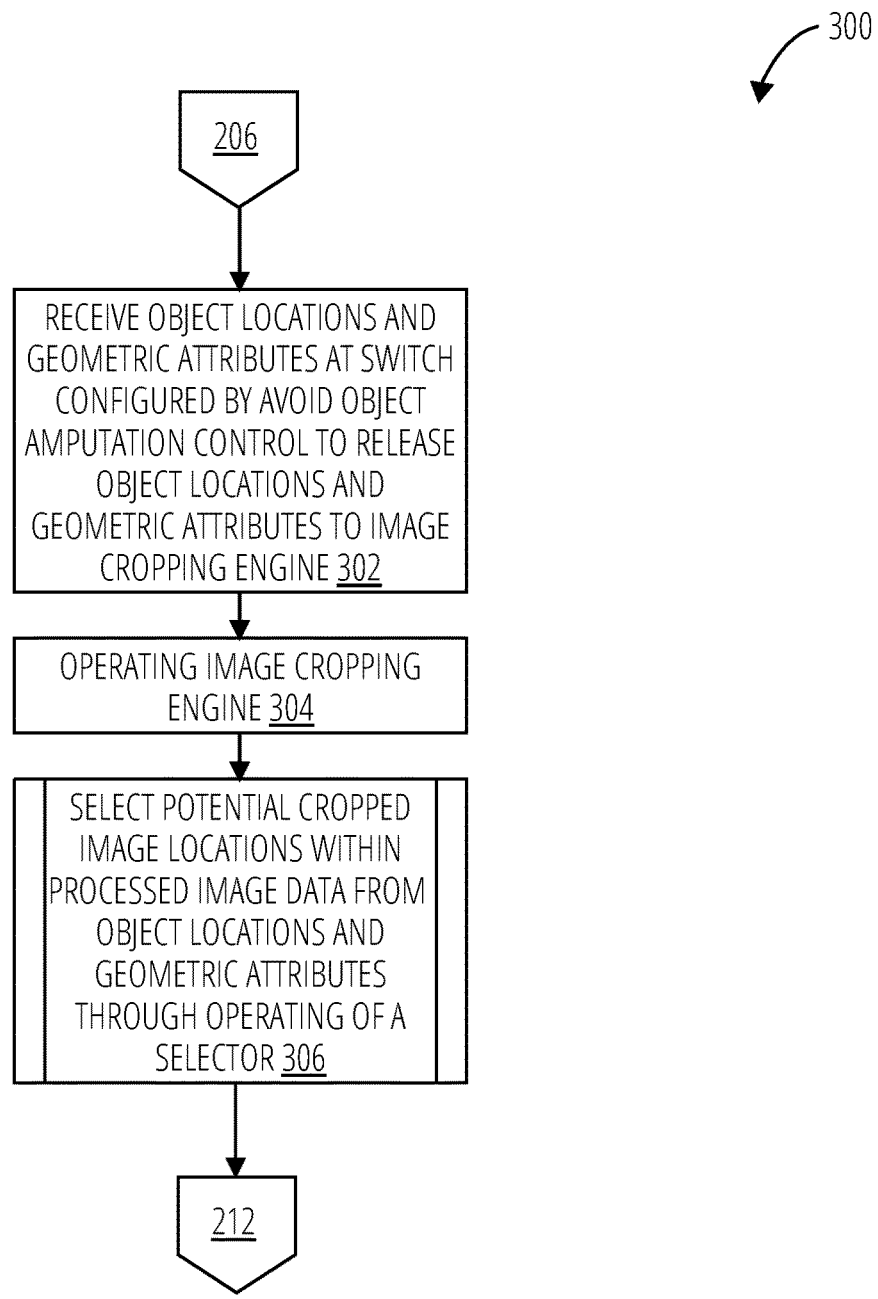
FIG. 3 illustrates a method 300 in accordance with one embodiment.

Referencing FIG. 3, a method 300 for operating a machine guided photo and video composition system is provided as an embodiment of the method 200. Continuing from block 206, the method 300 receives the object locations and the geometric attributes at a switch configured by an avoid object amputation control to release the object locations and the geometric attributes to the image cropping engine (block 302). The object locations and the geometric attributes identify the object locations as bounding boxes around the objects. In block 304, the method 300 operates the image cropping engine. In subroutine block 306, the image cropping engine selects the potential cropped image locations within the processed image data from the object locations and the geometric attributes through operating of a selector. The selector excludes the potential cropped image locations with partial bounding boxes around the objects. Following subroutine block 306, the method 300 continues to the subroutine block 212.

Figure 4:
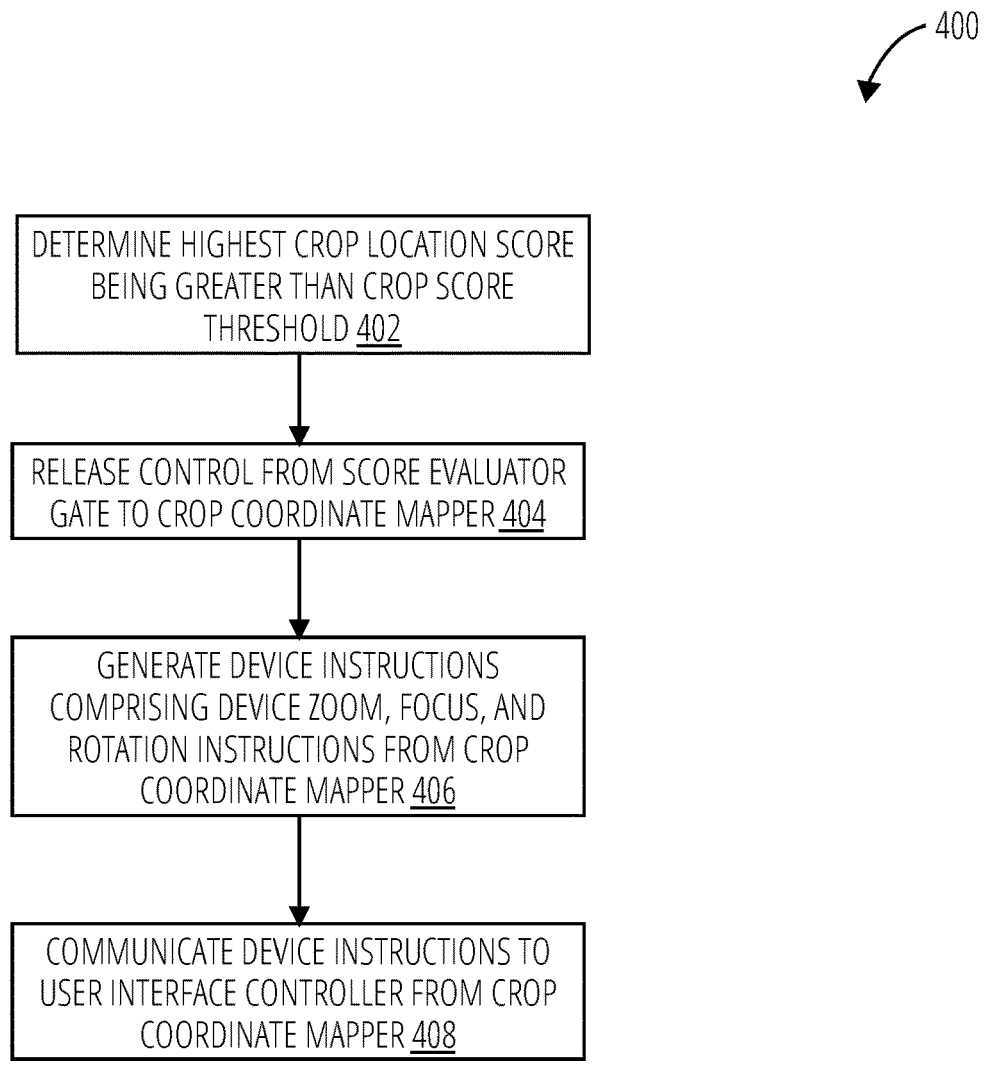
FIG. 4 illustrates a method 400 in accordance with one embodiment.

Referencing FIG. 4, a method 400 for operating a machine guided photo and video composition system involves determining the highest crop location score that is greater than a crop score threshold (block 402). In block 404, method 400 releases a control from the score evaluator gate to a crop coordinate mapper. In block 406, method 400 generates the device instructions comprising device zoom, focus, and rotation instructions from the crop coordinate mapper in response to receiving the control from the score evaluator gate. In block 408, method 400 communicates the device instructions to the user interface controller from the crop coordinate mapper.

Figure 5:
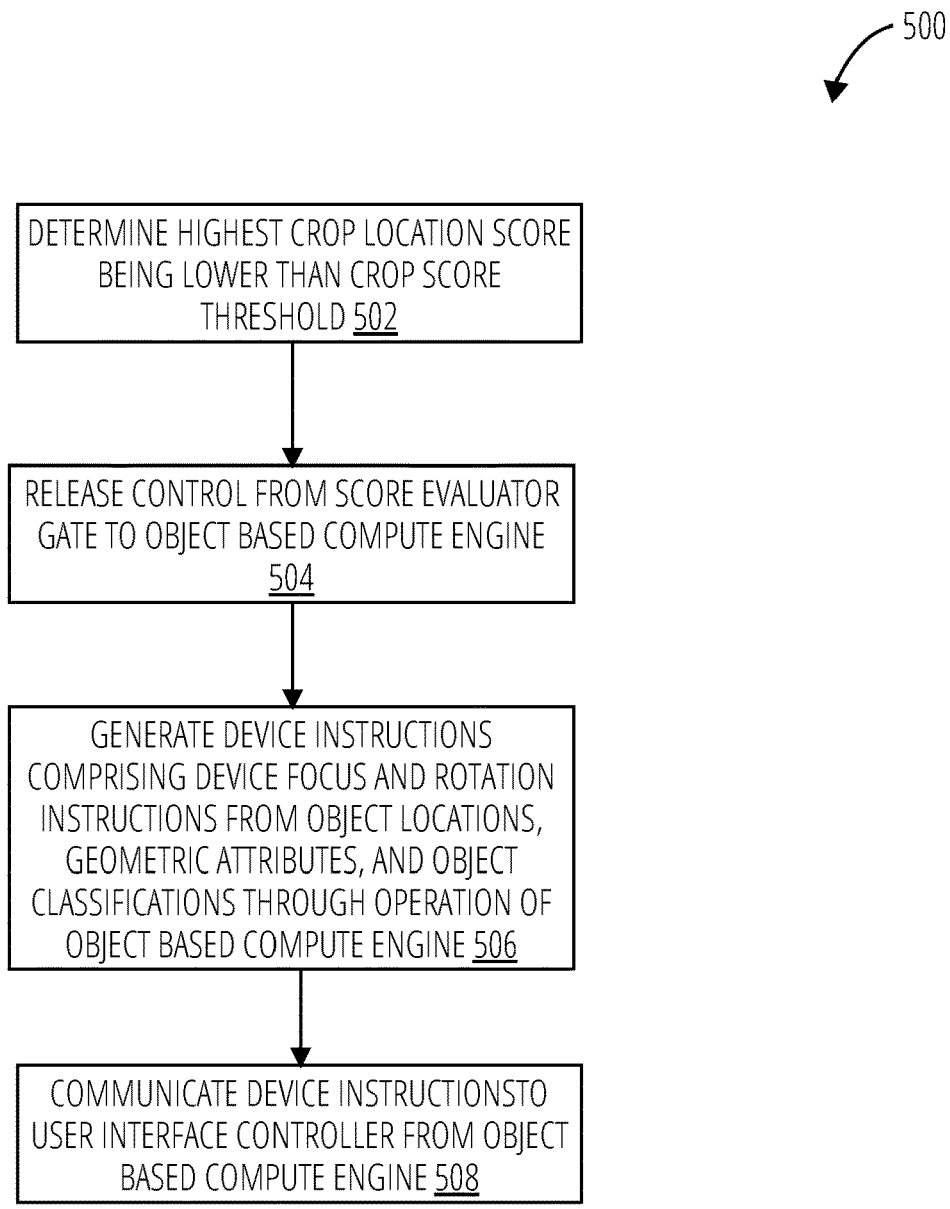
FIG. 5 illustrates a method 500 in accordance with one embodiment.

Referencing FIG. 5, a method 500 for operating a machine guided photo and video composition system involves determining the highest crop location score being lower than a crop score threshold (block 502). In block 504, method 500 releases a control from the score evaluator gate to an object based compute engine. In block 506, method 500 generates the device instructions comprising device focus and rotation instructions from the object locations, the geometric attributes, and the object classifications through operation of the object based compute engine in response to receiving the control from the score evaluator gate. In block 508, method 500 communicates the device instructions to the user interface controller from the object based compute engine.

Figure 6:
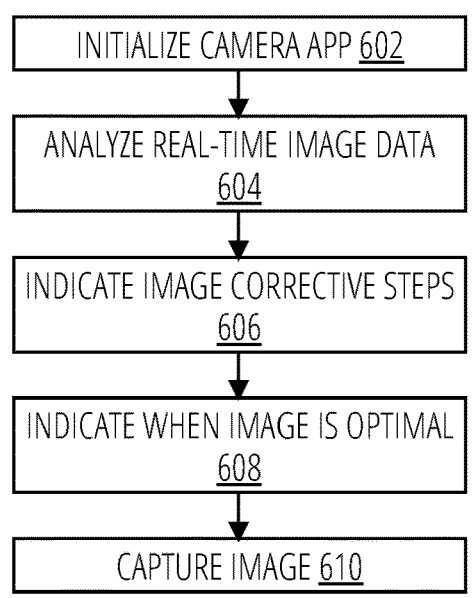
FIG. 6 illustrates a method 600 in accordance with one embodiment.

Referencing FIG. 6, a method 600 involves initializing a camera application on a camera equipped hardware device (block 602). In block 604, the method 600 analyzes the real-time image data from an image sensor through the object detection engine, the image cropping engine, the computer vision analysis engine, and the object classifier In block 604, the method 600 may analyze more than one frame of raw image data, but may utilize a single frame from the image data to perform the analysis operation. In some instances, the method 600 may utilize at least eight frames to perform its analysis. In block 606, the method 600 generates steps for a user indicating instructions to correct the current image shown through the display device. In block 608, the method 600 indicates to the user that the appropriate corrections have been made to their device. In block 610, the method 600 may then capture the image when it determines that the instructions have been followed by the user.

Figure 7:
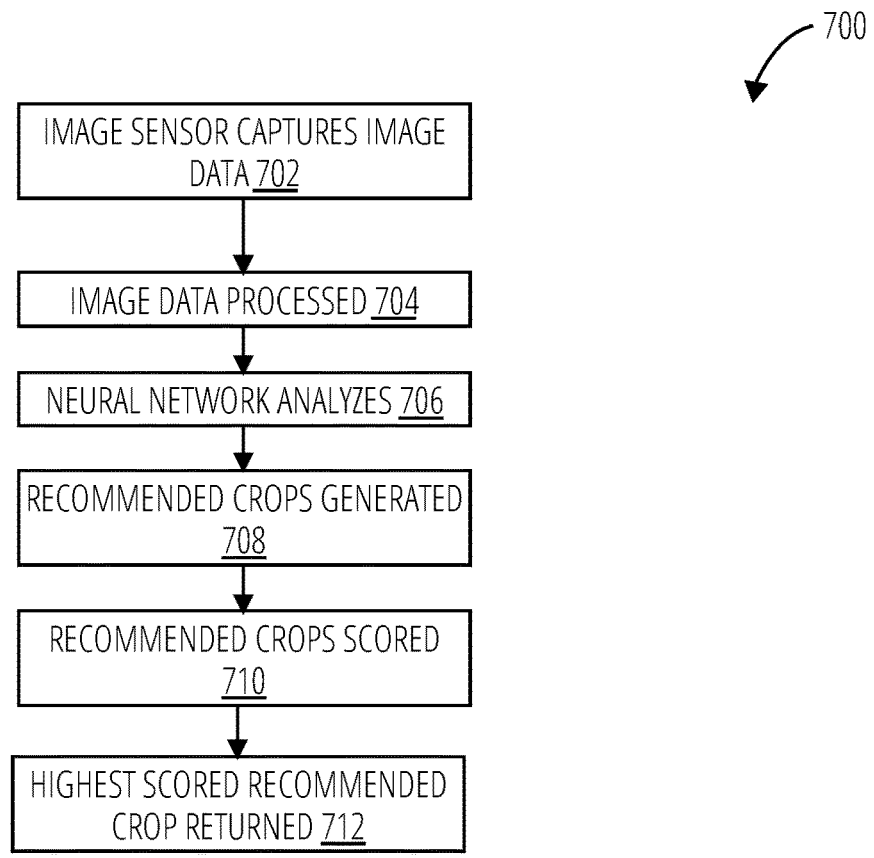
FIG. 7 illustrates a method 700 in accordance with one embodiment.

Referencing FIG. 7, the method 700 involves capturing image data through an image sensor (block 702). In block 704, the method 700 processes the image data reducing the pixel channel values of the image data by performing color corrections and/or resizing the image. In block 706, the method 700 utilizes a trained neural network to analyze the processed image data to determine objects and object locations within the image. In block 708, the method 700 generates recommend crops based on the objects and the object locations within the processed image data. In block 710, the method 700 scores the recommended crops based on similarity to crops determined by a trained neural network. In block 712, the method 700 determines the highest scoring crop locations and utilizes the crop location to generate instructions for the user to reposition/modify device settings to capture an image in the highest scoring crop location.

Figure 8:
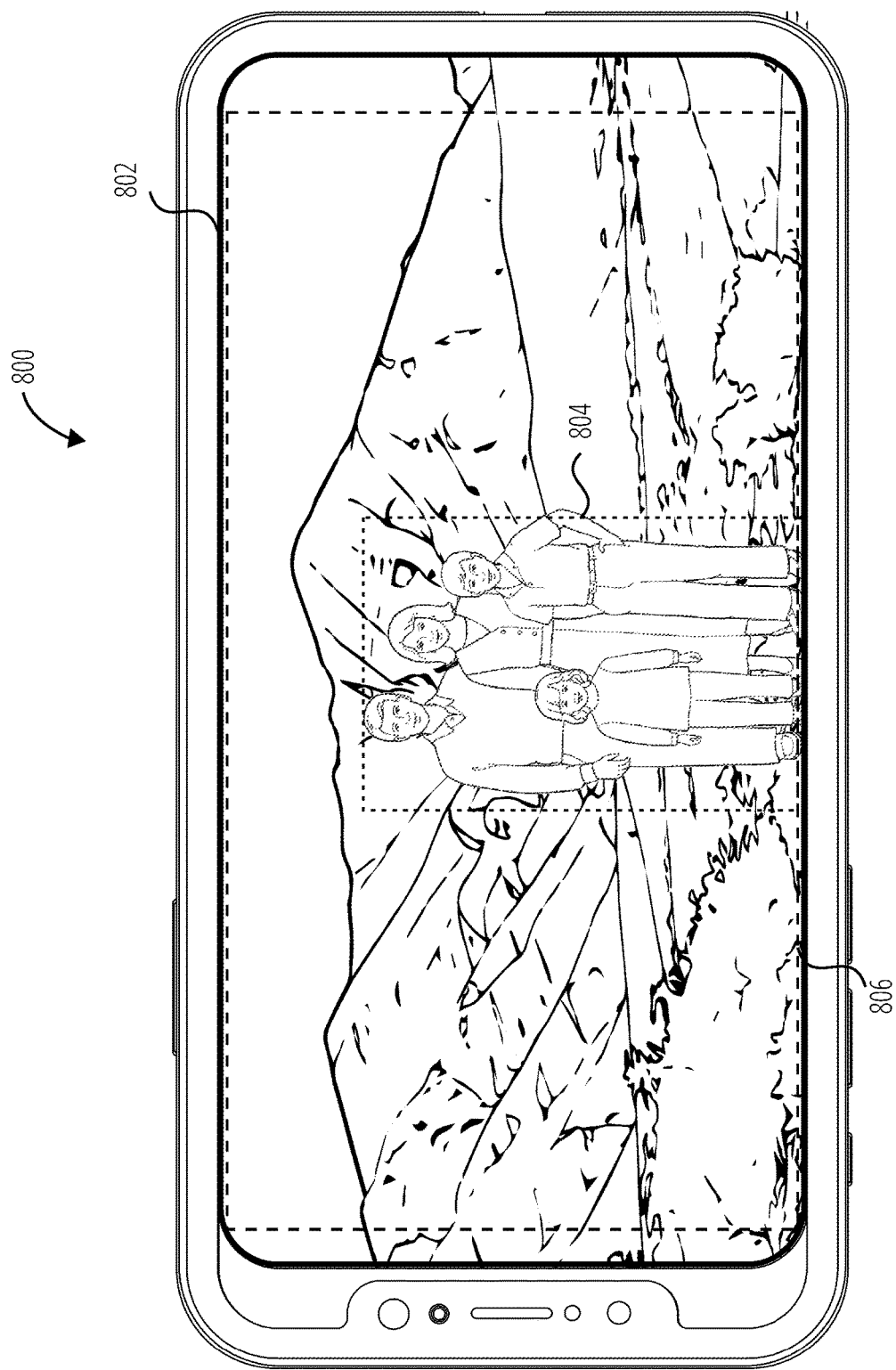
FIG. 8 illustrates a user interface 800 in accordance with one embodiment.

Referencing FIG. 8, a user interface 800 shows a display device 802 of a camera equipped hardware device displaying image data 806 comprising objects 804. The objects 804 show a family in the image data 806.

Figure 9:
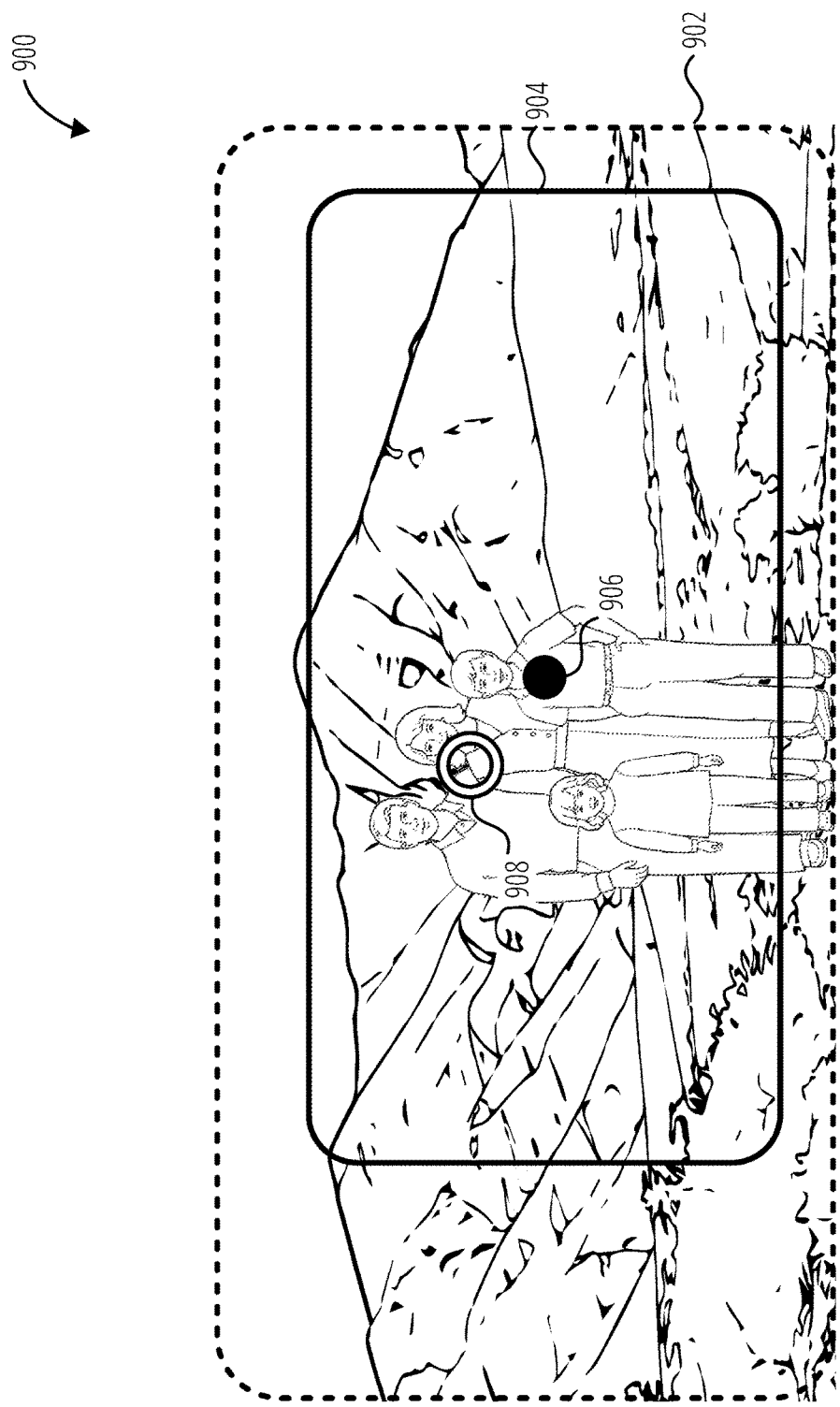
FIG. 9 illustrates a user interface 900 in accordance with one embodiment.

Referencing FIG. 9, a user interface 900 shows an embodiment of the device instructions displayed on the display device screen 902. The device instructions comprise a cropped view field 904, a device adjustment indicator 908, and a current device position indicator 906. A user would move their camera equipped hardware device to align the current device position indicator 906 with the device adjustment indicator 908 and then zoom in to the cropped view field 904 to capture the recommend image.

Figure 10:
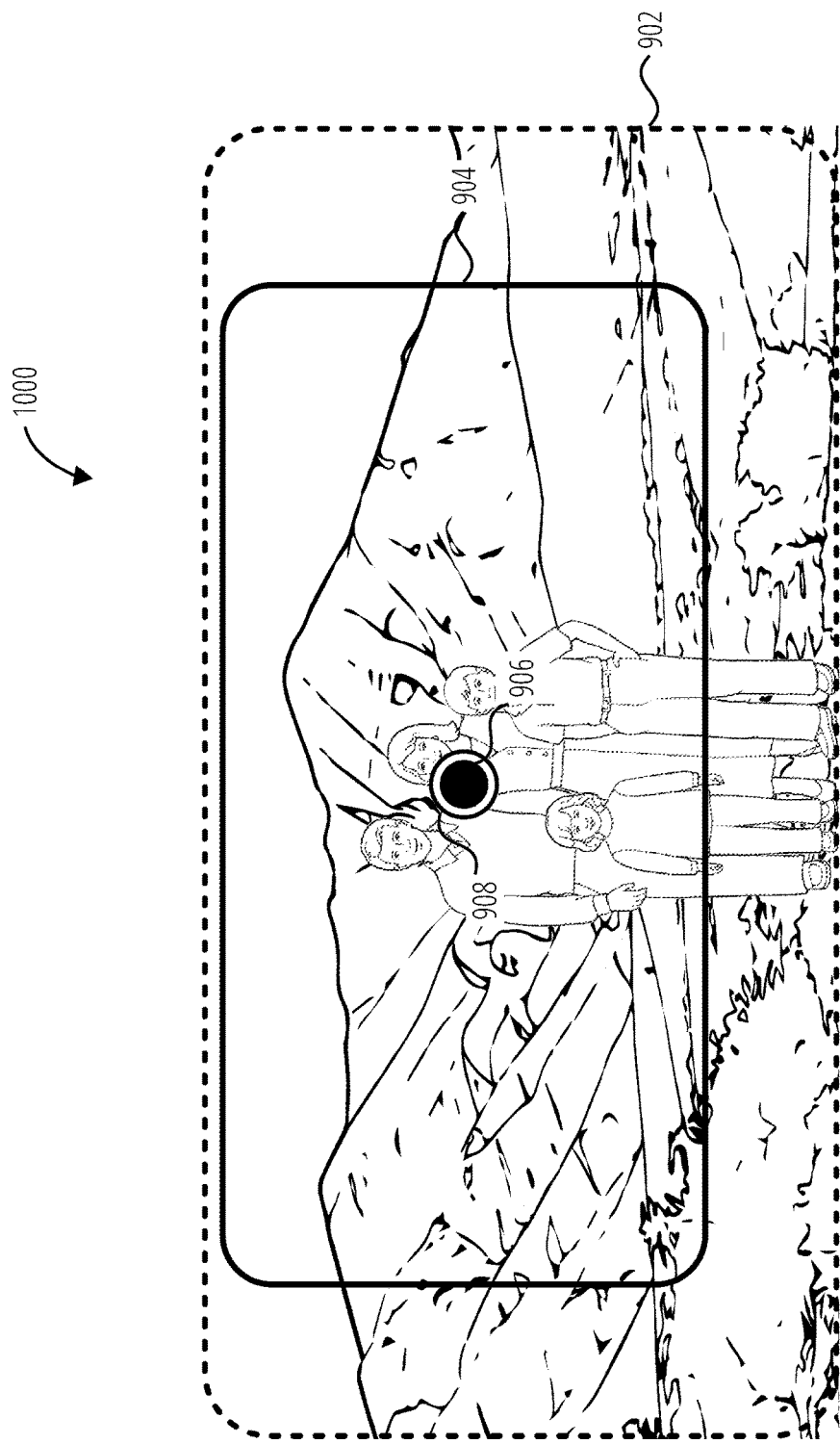
FIG. 10 illustrates a user interface 1000 in accordance with one embodiment.

Referencing FIG. 10, a user interface 1000 shows the movement of the current device position indicator 906 to the device adjustment indicator 908 aligning the current focal point of the device with the new focal point as per the device instructions. The last step of the instructions would be to zoom into the cropped view field 904.

Figure 11:
FIG. 11 illustrates a user interface 1100 in accordance with one embodiment.

Referencing FIG. 11, a user interface 1100 shows the camera equipped hardware device aligned and zoomed into the cropped view field 904 showing the cropped image 1102 and the recommend image composition.

Figure 12:
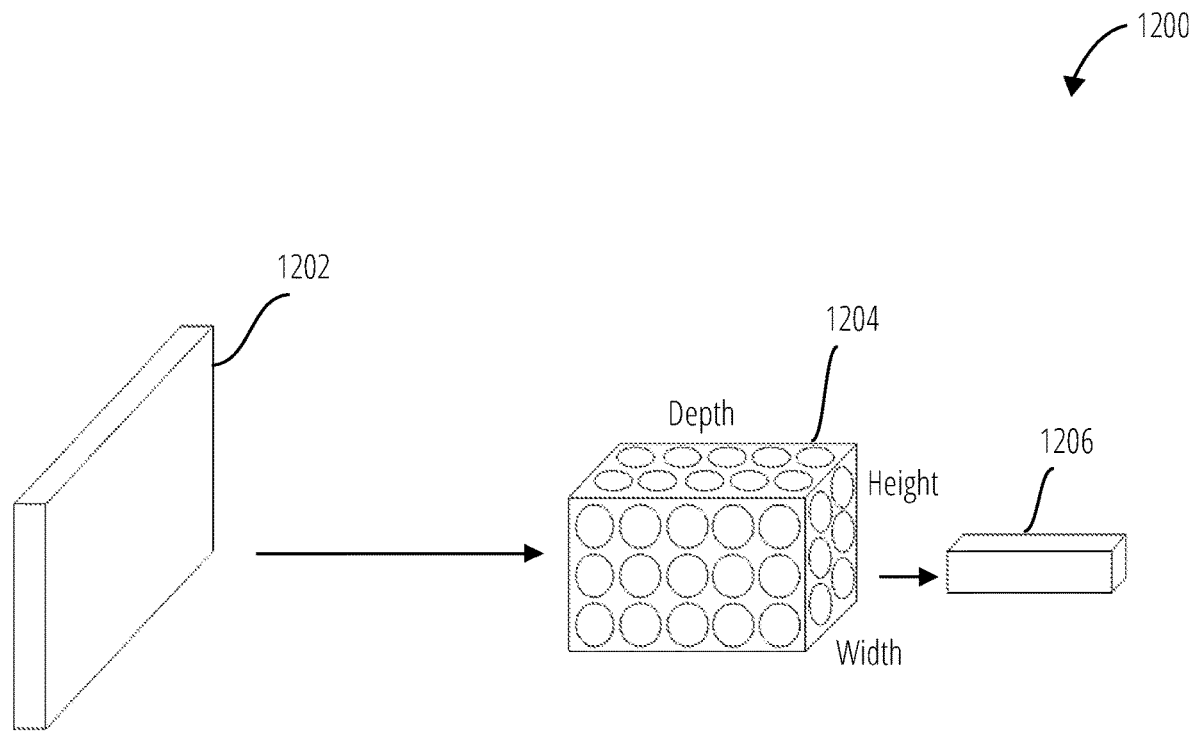
FIG. 12 illustrates a convolutional neural network 1200 in accordance with one embodiment.

FIG. 12 illustrates an exemplary convolutional neural network 1200. The convolutional neural network 1200 arranges its neurons in three dimensions (width, height, depth), as visualized in convolutional layer 1204. Every layer of the convolutional neural network 1200 transforms a 3D volume of inputs to a 3D output volume of neuron activations. In this example, the input layer 1202 encodes the image, so its width and height would be the dimensions of the image, and the depth would be 3 (Red, Green, Blue channels). The convolutional layer 1204 further transforms the outputs of the input layer 1202, and the output layer 1206 transforms the outputs of the convolutional layer 1204 into one or more classifications of the image content.

Figure 13:
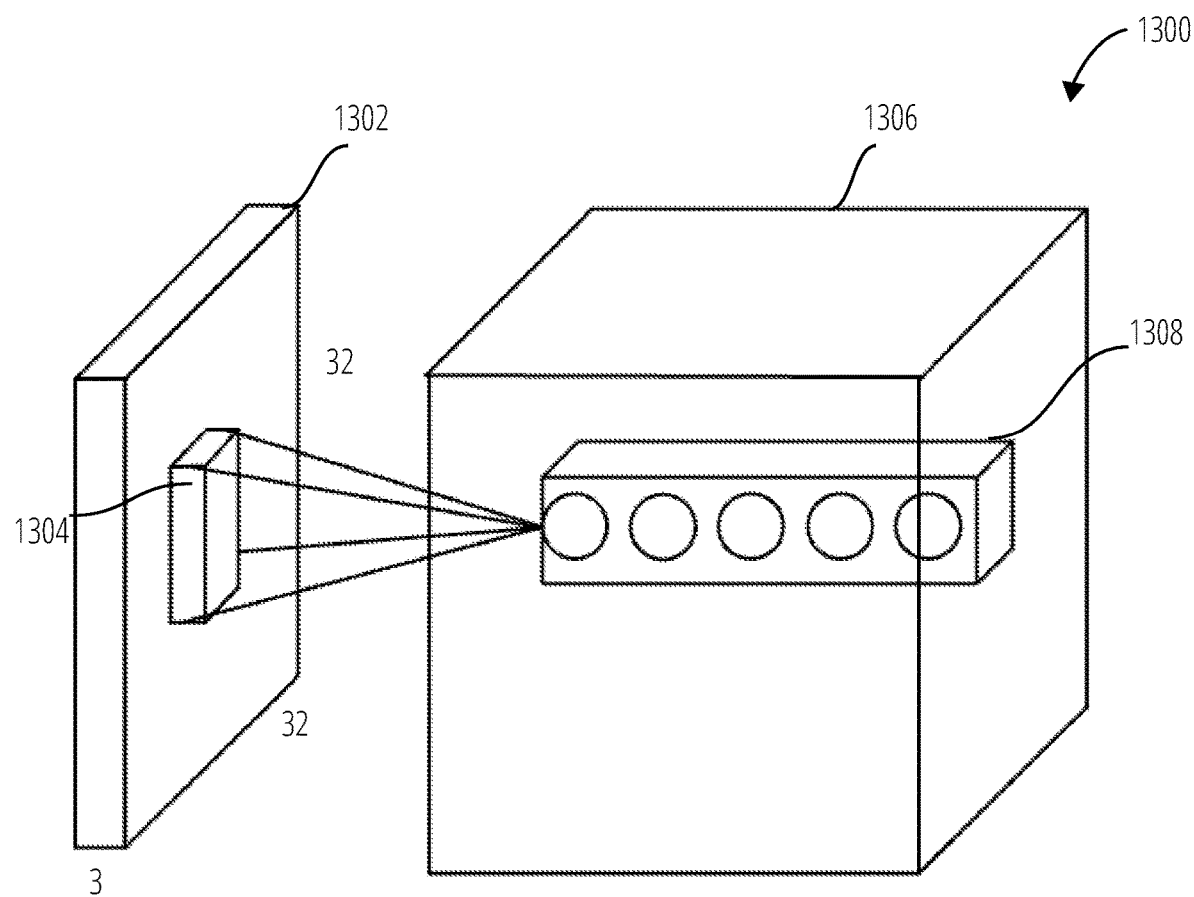
FIG. 13 illustrates a convolutional neural network layers 1300 in accordance with one embodiment.

FIG. 13 illustrates an exemplary convolutional neural network layers 1300 in more detail. An example subregion of the input layer region 1304 of an input layer region 1302 region of an image is analyzed by a set of convolutional layer subregion 1308 in the convolutional layer 1306. The input layer region 1302 is 32×32 neurons long and wide (e.g., 32×32 pixels), and three neurons deep (e.g., three color channels per pixel). Each neuron in the convolutional layer 1306 is connected only to a local region in the input layer region 1302 spatially (in height and width), but to the full depth (i.e. all color channels if the input is an image). Note, there are multiple neurons (5 in this example) along the depth of the convolutional layer subregion 1308 that analyzes the subregion of the input layer region 1304 of the input layer region 1302, in which each neuron of the convolutional layer subregion 1308 may receive inputs from every neuron of the subregion of the input layer region 1304.

Figure 14:
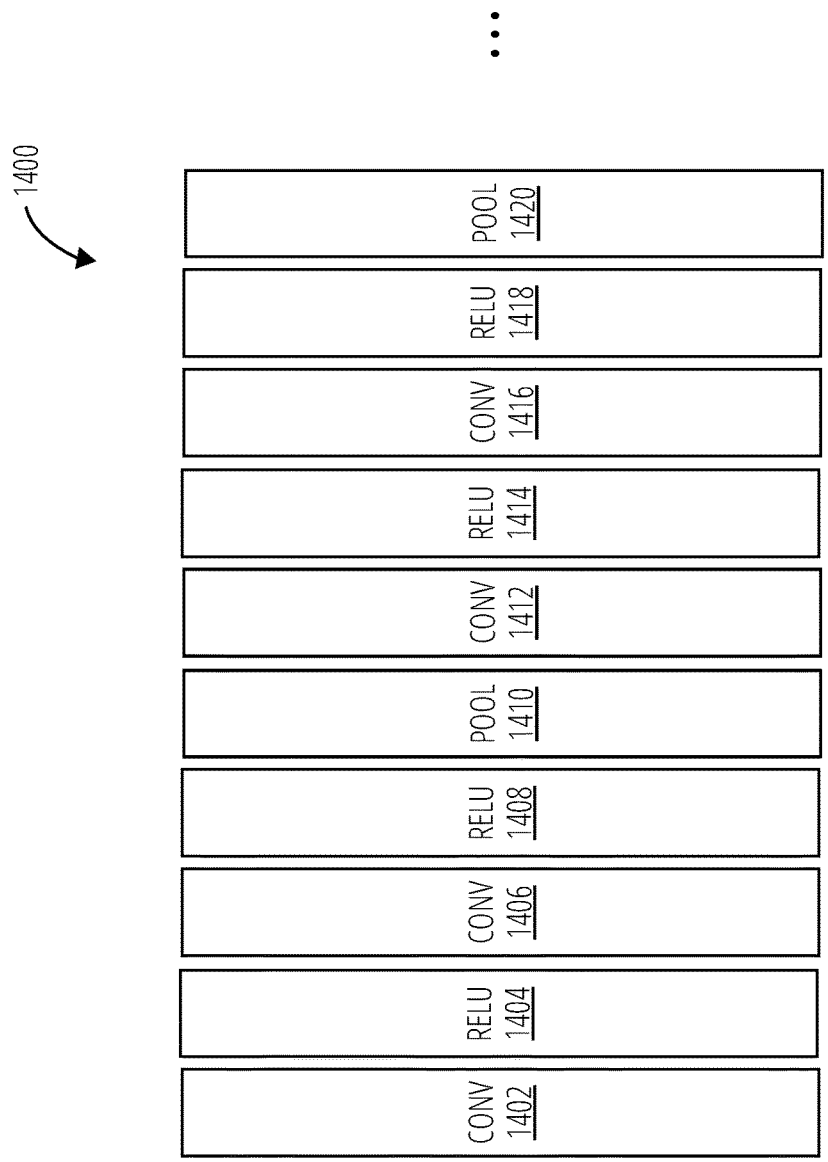
FIG. 14 illustrates a VGG net 1400 in accordance with one embodiment.

FIG. 14 illustrates a popular form of a CNN known as a VGG net 1400. The initial convolution layer 1402 stores the raw image pixels and the final pooling layer 1420 determines the class scores. Each of the intermediate convolution layers (convolution layer 1406, convolution layer 1412, and convolution layer 1416) and rectifier activations (RELU layer 1404, RELUlayer 1408, RELUlayer 1414, and RELUlayer 1418) and intermediate pooling layers (pooling layer 1410, pooling layer 1420) along the processing path is shown as a column.

In some configurations, the process for operating a machine guided photo and video composition system utilizes ReLu but may also utilize sigmoid, tan h, leaky ReLu and etc as one of the activation layers. In some configurations, the process for operating a machine guided photo and video compositions system may also utilize depth wise and pointwise, deconvolution, for pooling. The system may also perform max pooling, average pooling, or a combination of both.

The VGG net 1400 replaces the large single-layer filters of basic CNNs with multiple 3×3 sized filters in series. With a given receptive field (the effective area size of input image on which output depends), multiple stacked smaller size filters may perform better at image feature classification than a single layer with a larger filter size, because multiple non-linear layers increase the depth of the network which enables it to learn more complex features. In a VGG net 1400 each pooling layer may be only 2×2.

Figure 15:
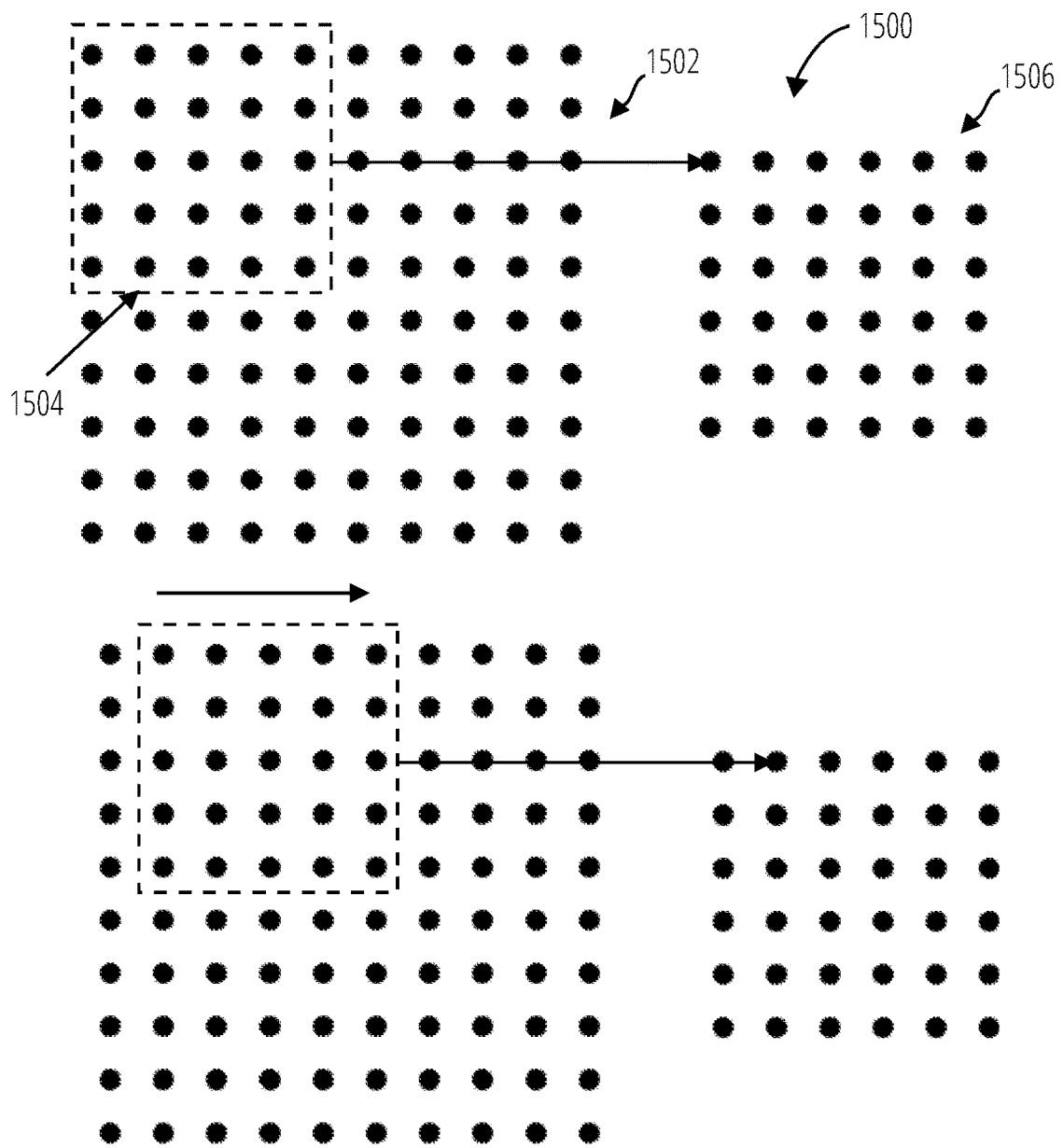
FIG. 15 illustrates a convolution layer filtering 1500 in accordance with one embodiment.

FIG. 15 illustrates a convolution layer filtering 1500 that connects the outputs from groups of neurons in a convolution layer 1502 to neurons in a next layer 1506. A receptive field is defined for the convolution layer 1502, in this example sets of 5×5 neurons. The collective outputs of each neuron the receptive field are weighted and mapped to a single neuron in the next layer 1506. This weighted mapping is referred to as the filter 1504 for the convolution layer 1502 (or sometimes referred to as the kernel of the convolution layer 1502). The filter 1504 depth is not illustrated in this example (i.e., the filter 1504 is actually a cubic volume of neurons in the convolution layer 1502, not a square as illustrated). Thus what is shown is a "slice" of the full filter 1504. The filter 1504 is slid, or convolved, around the input image, each time mapping to a different neuron in the next layer 1506. For example FIG. 15 shows how the filter 1504 is stepped to the right by 1 unit (the "stride"), creating a slightly offset receptive field from the top one, and mapping its output to the next neuron in the next layer 1506. The stride can be and often is other numbers besides one, with larger strides reducing the overlaps in the receptive fields, and hence further reducing the size of the next layer 1506. Every unique receptive field in the convolution layer 1502 that can be defined in this stepwise manner maps to a different neuron in the next layer 1506. Thus, if the convolution layer 1502 is 32×32×3 neurons per slice, the next layer 1506 need only be 28×28×1 neurons to cover all the receptive fields of the convolution layer 1502. This is referred to as an activation map or feature map. There is thus a reduction in layer complexity from the filtering. There are 784 different ways that a 5×5 filter can uniquely fit on a 32×32 convolution layer 1502, so the next layer 1506 need only be 28×28. The depth of the convolution layer 1502 is also reduced from 3 to 1 in the next layer 1506.

The number of total layers to use in a CNN, the number of convolution layers, the filter sizes, and the values for strides at each layer are examples of "hyperparameters" of the CNN.

Figure 16:
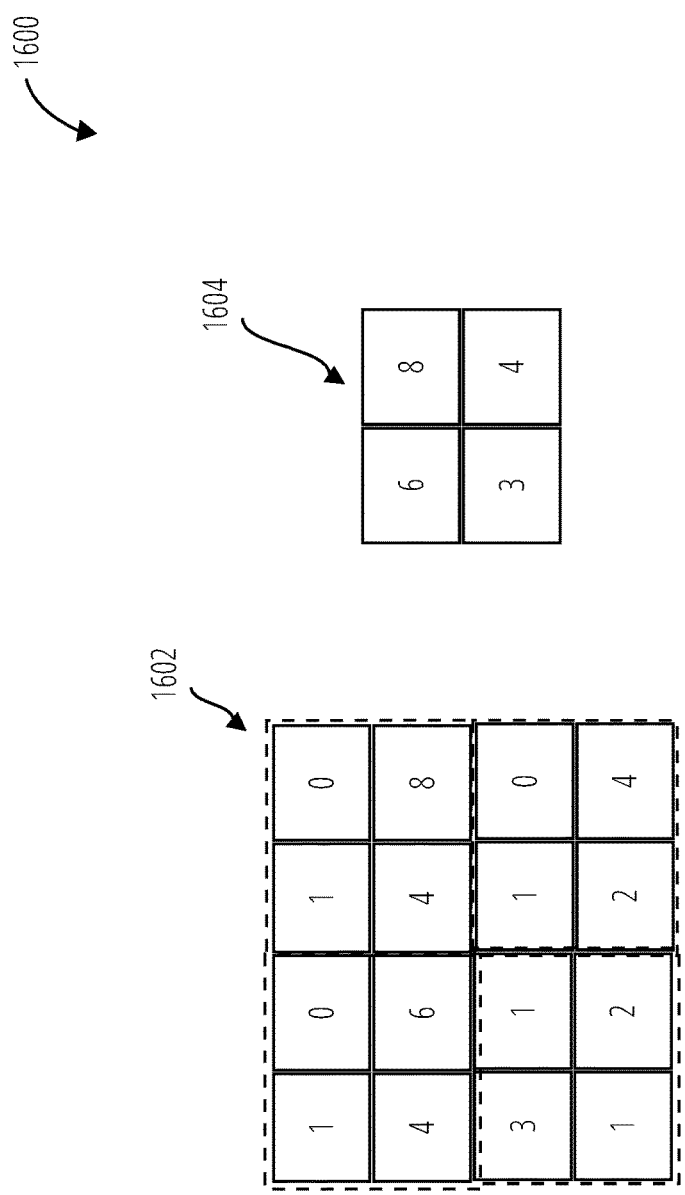
FIG. 16 illustrates a pooling layer function 1600 in accordance with one embodiment.

FIG. 16 illustrates a pooling layer function 1600 with a 2×2 receptive field and a stride of two. The pooling layer function 1600 is an example of the maxpool pooling technique. The outputs of all the neurons in a particular receptive field of the input layer 1602 are replaced by the maximum valued one of those outputs in the pooling layer 1604. Other options for pooling layers are average pooling and L2-norm pooling. The reason to use a pooling layer is that once a specific feature is recognized in the original input volume (there will be a high activation value), its exact location is not as important as its relative location to the other features. Pooling layers can drastically reduce the spatial dimension of the input layer 1602 from that pont forward in the neural network (the length and the width change but not the depth). This serves two main purposes. The first is that the amount of parameters or weights is greatly reduced thus lessening the computation cost. The second is that it will control overfitting. Overfitting refers to when a model is so tuned to the training examples that it is not able to generalize well when applied to live data sets.

Figure 17:
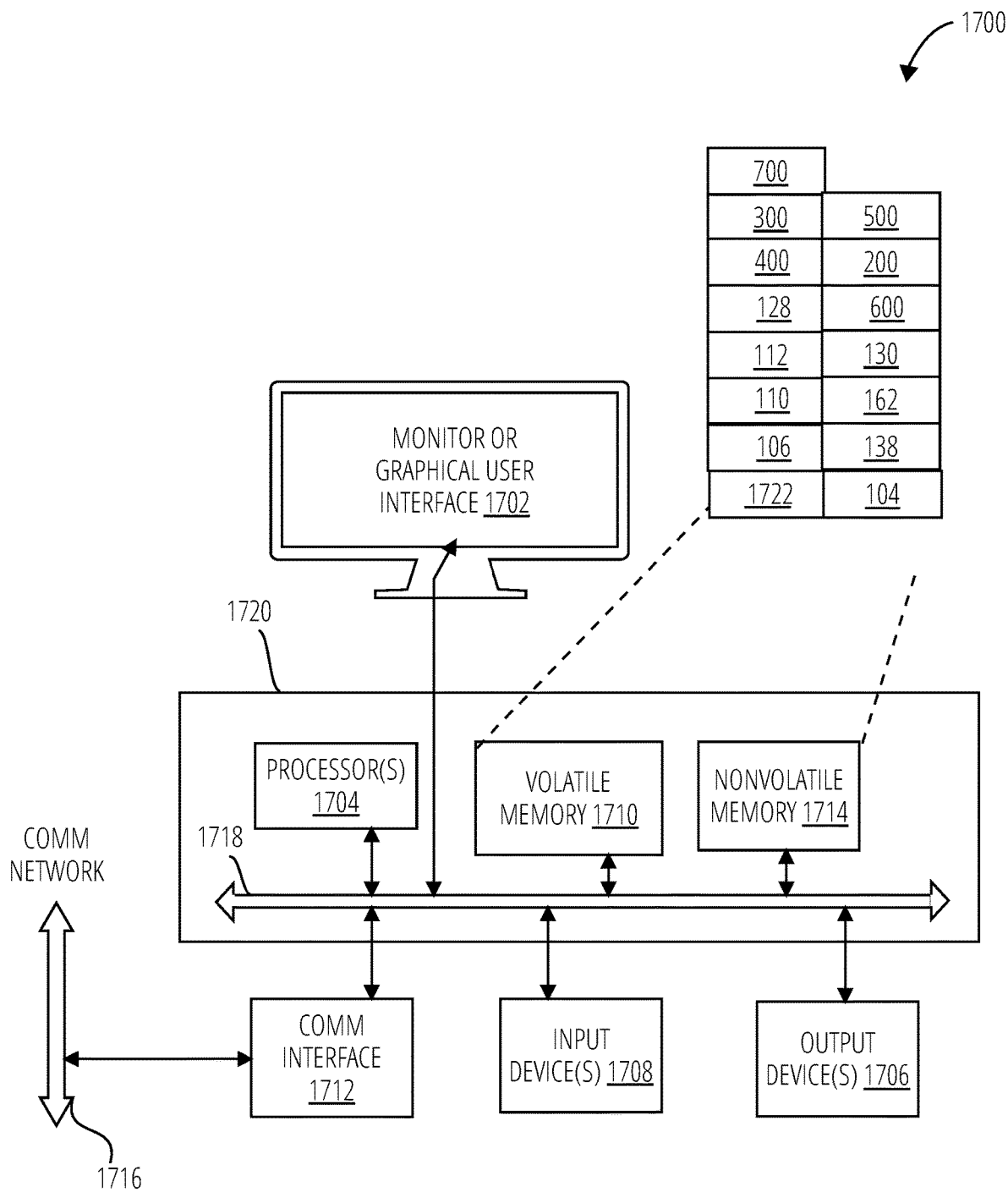
FIG. 17 is an example block diagram of a computing device 1700 that may incorporate embodiments of the present invention.

FIG. 17 is an example block diagram of a computing device 1700 that may incorporate embodiments of the present invention. FIG. 17 is merely illustrative of a machine system to carry out aspects of the technical processes described herein, and does not limit the scope of the claims. One of ordinary skill in the art would recognize other variations, modifications, and alternatives. In one embodiment, the computing device 1700 typically includes a monitor or graphical user interface 1702, a data processing system 1720, a communication network interface 1712, input device(s) 1708, output device(s) 1706, and the like.

As depicted in FIG. 17, the data processing system 1720 may include one or more processor(s) 1704 that communicate with a number of peripheral devices via a bus subsystem 1718. These peripheral devices may include input device(s) 1708, output device(s) 1706, communication network interface 1712, and a storage subsystem, such as a volatile memory 1710 and a nonvolatile memory 1714.

The volatile memory 1710 and/or the nonvolatile memory 1714 may store computer-executable instructions and thus forming logic 1722 that when applied to and executed by the processor(s) 1704 implement embodiments of the processes disclosed herein. The logic 1722 in the volatile memory 1710 and the nonvolatile memory 1714 may include method 700, method 300, method 500, method 400, method 600, method 200, the object based compute engine 128, the user interface controller 112, the object classifier 130, the image cropping engine 110, the switch 162, the object detection engine 106, the crop coordinate mapper 138, and the image processor 104.

The input device(s) 1708 include devices and mechanisms for inputting information to the data processing system 1720. These may include a keyboard, a keypad, a touch screen incorporated into the monitor or graphical user interface 1702, audio input devices such as voice recognition systems, microphones, and other types of input devices. In various embodiments, the input device(s) 1708 may be embodied as a computer mouse, a trackball, a track pad, a joystick, wireless remote, drawing tablet, voice command system, eye tracking system, and the like. The input device(s) 1708 typically allow a user to select objects, icons, control areas, text and the like that appear on the monitor or graphical user interface 1702 via a command such as a click of a button or the like.

The output device(s) 1706 include devices and mechanisms for outputting information from the data processing system 1720. These may include the monitor or graphical user interface 1702, speakers, printers, infrared LEDs, and so on as well understood in the art.

The communication network interface 1712 provides an interface to communication networks (e.g., communication network 1716) and devices external to the data processing system 1720. The communication network interface 1712 may serve as an interface for receiving data from and transmitting data to other systems. Embodiments of the communication network interface 1712 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 1712 may be coupled to the communication network 1716 via an antenna, a cable, or the like. In some embodiments, the communication network interface 1712 may be physically integrated on a circuit board of the data processing system 1720, or in some cases may be implemented in software or firmware, such as "soft modems", or the like.

The computing device 1700 may include logic that enables communications over a network using protocols such as HTTP, TCP/IP, RTP/RTSP, IPX, UDP and the like.

The volatile memory 1710 and the nonvolatile memory 1714 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1710 and the nonvolatile memory 1714 may be configured to store the basic programming and data constructs that provide the functionality of the disclosed processes and other embodiments thereof that fall within the scope of the present invention.

Logic 1722 that implements embodiments of the present invention may be stored in the volatile memory 1710 and/or the nonvolatile memory 1714. Said logic 1722 may be read from the volatile memory 1710 and/or nonvolatile memory 1714 and executed by the processor(s) 1704. The volatile memory 1710 and the nonvolatile memory 1714 may also provide a repository for storing data used by the logic 1722.

The volatile memory 1710 and the nonvolatile memory 1714 may include a number of memories including a main random access memory (RAM) for storage of instructions and data during program execution and a read only memory (ROM) in which read-only non-transitory instructions are stored. The volatile memory 1710 and the nonvolatile memory 1714 may include a file storage subsystem providing persistent (non-volatile) storage for program and data files. The volatile memory 1710 and the nonvolatile memory 1714 may include removable storage systems, such as removable flash memory.

The bus subsystem 1718 provides a mechanism for enabling the various components and subsystems of data processing system 1720 communicate with each other as intended. Although the communication network interface 1712 is depicted schematically as a single bus, some embodiments of the bus subsystem 1718 may utilize multiple distinct busses.

It will be readily apparent to one of ordinary skill in the art that the computing device 1700 may be a device such as a smartphone, a desktop computer, a laptop computer, a rack-mounted computer system, a computer server, or a tablet computer device. As commonly known in the art, the computing device 1700 may be implemented as a collection of multiple networked computing devices. Further, the computing device 1700 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/ or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"engine" refers to logic that inputs signals that affect internal processes of the logic to generate deterministic outputs, typically in a manner optimized for efficiency and speed (vs. size or machine resource utilization).

What is claimed is:

1. A method comprising:
    generating processed image data with reduced pixel channel values from a raw image data through operation of an image processor;
    operating an object detection engine to identify objects and object locations in the processed image data through use of an object detection algorithm;
    operating a computer vision analysis engine to identify geometric attributes of objects in the processed image data through use of a line geometry analysis algorithm;
    operating an image cropping engine to:
        select potential cropped image locations within the processed image data through operation of a selector;
        generate crop location scores for each of the potential cropped image locations and determine highest scored cropped image location through operating of a cropped image evaluator; and
        communicate highest crop location score for the highest scored cropped image location to a score evaluator gate;
    generating object classifications from the object locations and the geometric attributes through operation of an object classifier;
    receiving device instructions at a user interface controller by way of the score evaluator gate; and
    configuring a display device to display device positioning instructions transformed from the received device instructions.

2. The method of claim 1 comprising:
    receiving the object locations and the geometric attributes at a switch configured by an avoid object amputation control to release the object locations and the geometric attributes to the image cropping engine, wherein the object locations and the geometric attributes identify the object locations as bounding boxes around the objects; and
    operating the image cropping engine to:
        select the potential cropped image locations within the processed image data from the object locations and the geometric attributes through operating of a selector, wherein the selector excludes the potential cropped image locations with partial bounding boxes around the objects.

3. The method of claim 1, wherein the object detection algorithm utilizes a convolutional neural network machine learning algorithm to identify the objects and the object locations in the processed image data.

4. The method of claim 1, wherein the cropped image evaluator utilizes a convolutional neural network machine learning algorithm to determine the highest scored cropped image location.

5. The method of claim 1 further comprising:
    releasing a control from the score evaluator gate to a crop coordinate mapper in response to the highest crop location score being greater than a crop score threshold;
    generating the device instructions comprising device zoom, focus, and rotation instructions from the crop coordinate mapper in response to receiving the control from the score evaluator gate; and
    communicating the device instructions to the user interface controller from the crop coordinate mapper.

6. The method of claim 1 further comprising:
    releasing a control from the score evaluator gate to an object based compute engine in response to the highest crop location score being lower than a crop score threshold;
    generating the device instructions comprising device focus and rotation instructions from the object locations, the geometric attributes, and the object classifications through operation of the object based compute engine in response to receiving the control from the score evaluator gate; and
    communicating the device instructions to the user interface controller from the object based compute engine.

7. The method of claim 1, wherein the user interface controller generates revised device positioning instructions in response to a device position information from the display device.

* * * * *